United States Patent [19]

Van Der Maas

[11] 4,270,512

[45] Jun. 2, 1981

[54] HEAT STORING FIREPLACE

[76] Inventor: Robert E. Van Der Maas, 2020 NE. 127th St., Seattle, Wash. 98125

[21] Appl. No.: 883,651

[22] Filed: Mar. 6, 1978

[51] Int. Cl.³ .............................................. F24B 7/00
[52] U.S. Cl. ................................... 126/121; 126/400; 126/132; 126/143; 165/46; 165/104.17
[58] Field of Search ............... 126/400, 120, 121, 143, 126/122, 123, 124, 131, 132; 165/DIG. 4, 104 S, 46, 146; 637/55

[56] References Cited

U.S. PATENT DOCUMENTS

| | | | |
|---|---|---|---|
| 2,243,503 | 5/1941 | Frenette | 237/55 |
| 3,073,575 | 1/1963 | Schulenberg | 165/146 |
| 3,773,031 | 11/1973 | Laing et al. | 165/104 S |
| 3,960,205 | 6/1976 | Laing | 165/104 S |
| 3,960,207 | 6/1976 | Boer | 126/400 |
| 4,037,583 | 7/1977 | Bakun et al. | 126/400 X |
| 4,049,194 | 9/1977 | Tice et al. | 126/122 X |
| 4,089,142 | 5/1978 | Kachadorian | 126/400 X |
| 4,142,576 | 3/1979 | Perry et al. | 165/104 S |

FOREIGN PATENT DOCUMENTS

| | | | |
|---|---|---|---|
| 2543 | of 1872 | United Kingdom | 126/122 |
| 732992 | 7/1955 | United Kingdom | 126/132 |

*Primary Examiner*—Samuel Scott
*Assistant Examiner*—Lee E. Barrett
*Attorney, Agent, or Firm*—Seed, Berry, Vernon & Baynham

[57] ABSTRACT

A heat storing fireplace including a fire-box surrounded by a heat storage medium which is either an enclosure containing a material having a high specific heat such as sand or gravel or a large number of heat conducting bags containing a high specific heat material. Exhaust gases are conveyed from the fire-box to an exhaust outlet by several conduits extending through the heat storage medium in a circuitous path in order to transfer heat from the exhaust gases to the heat storage medium. Heat is further distributed through the storage material by a heat conducting lattice fastened to the conduits and extending through the storage medium in a circuitous path. Combustion air enters the bottom of the fire box through a combustion air inlet jacket surrounding the exhaust outlet in order to simultaneously pre-warm the combustion air while thermally insulating the exhaust outlet from its support structure. A draft is created through the fire-box by an exhaust fan mounted in the exhaust outlet. Although the heat storage medium is primarily heated by burning fuel in the fire-box, it may also be heated by either an electric grill or solar heat exchanger embedded in the heat storage medium. The upper portion of the storage medium is covered by a ventilating plenum which allows heat to escape from the enclosure. The plenum has a pair of ventilated sidewalls separated from each other by a baffle. A fan, which may be thermostatically controlled, is positioned in an opening in the baffle in order to selectively produce air flow through the plenum. Heat in the storage medium may also be utilized by placing a hot water heating heat exchanger in the storage medium.

4 Claims, 7 Drawing Figures

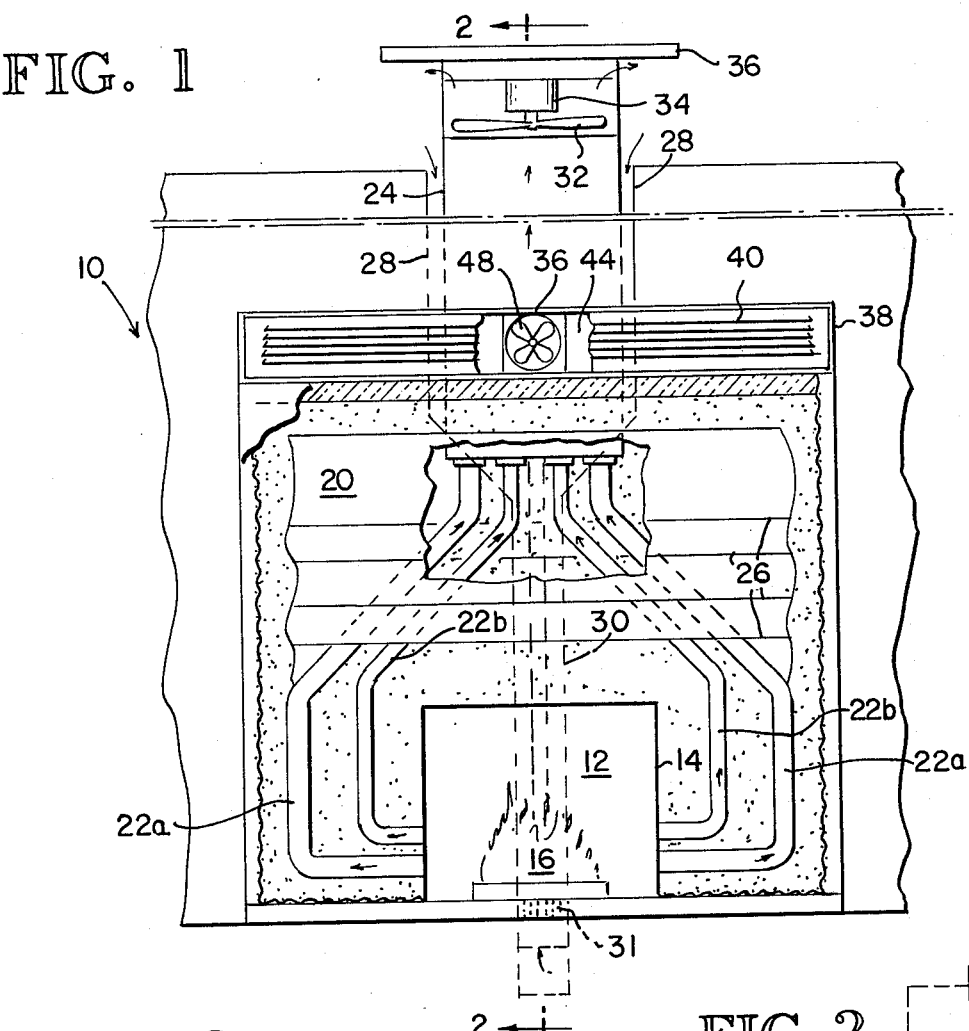

HEAT STORING FIREPLACE

BACKGROUND OF THE INVENTION

1. Field of the Invention

This invention relates to heating systems, and more particularly, to a heating system for producing heat over a relatively short period and for subsequently utilizing the heat as desired over a relatively long period.

2. Description of the Prior Art

With the increasing cost of energy, it has become increasingly important to utilize energy efficiently. One common heat producing device is a fireplace which generates a large amount of heat at a fairly low cost. One problem with the conventional fireplace which reduces its efficiency and makes it impractical for sustained heating is the difficulty of regulating the heat output. The heat from the fireplace is generally an almost instantaneous function of the magnitude of the fire in the fireplace. Consequently, in order to maintain the heat from a fireplace at a predetermined level, it is necessary to constantly add fuel to the fire, a requirement which is not often practical. Also, too much fuel is frequently added to the fire which is very wasteful of heat.

Another problem which prevents the optimum utilization of energy is the fluctuating demand for energy. Often there is sufficient or even an excess of electrical or solar power available during certain periods of the day, but such surplus may not be available when the need for energy is at its peak. This problem greatly increases the cost of energy since, in the case of electrical energy, sufficient capital equipment must be provided to provide the required power during peak loads.

SUMMARY OF THE INVENTION

It is an object of this invention to provide a means for storing heat produced in a fireplace in order to limit the heat output from the fireplace while allowing the heat to be slowly dissipated.

It is another object of the invention to consume energy during periods of peak availability while utilizing heat transformed from the energy during periods of relative unavailability.

These and other objects of the invention are accomplished by a heat storing fireplace having a fire box surrounded by a heat storage medium having a relatively high specific heat. In one embodiment the heat storage medium is a material having a high specific heat surrounded by an enclosure. In another embodiment the storage medium is a large number of heat conducting bags containing a high specific heat material. Exhaust gases from the burning fuel in the fire box flow through a plurality of conduits positioned between the fire box and a common exhaust outlet. The conduits are positioned along circuitous routes to distribute heat within the storage medium and further distribution is provided by a heat conducting lattice interconnecting the conduits and extending through the storage medium in a circuitous path. The upper portion of the enclosure is selectively vented in order to dissipate heat from the storage medium to the surroundings so that the heat output from the burning fuel is limited by the insulative effect of the storage medium, and the heat from the burning fuel may be dissipated over a relatively long period. The draft in the fireplace is created by an air-conveying means drawing exhaust gases through the exhaust outlet, and the sizes of the conduits are adjusted to equalize the flow among the conduits. The exhaust outlet is preferably surrounded by an air inlet jacket in order to simultaneously preheat the combustion air while thermally isolating the exhaust outlet from the surrounding support structure.

BRIEF DESCRIPTION OF THE FIGURES OF THE DRAWING

FIG. 1 is a front elevational view of one embodiment of the heat storing fireplace.

FIG. 2 is a cross-sectional view of the heat storing fireplace taken along the line 1—1 of FIG. 2.

FIG. 3 is a front elevational view of the fireplace of FIG. 1 showing an electrical heating element embedded in the heat storage medium.

DETAILED DESCRIPTION OF THE PREFERRED EMBODIMENT

Figure 4:
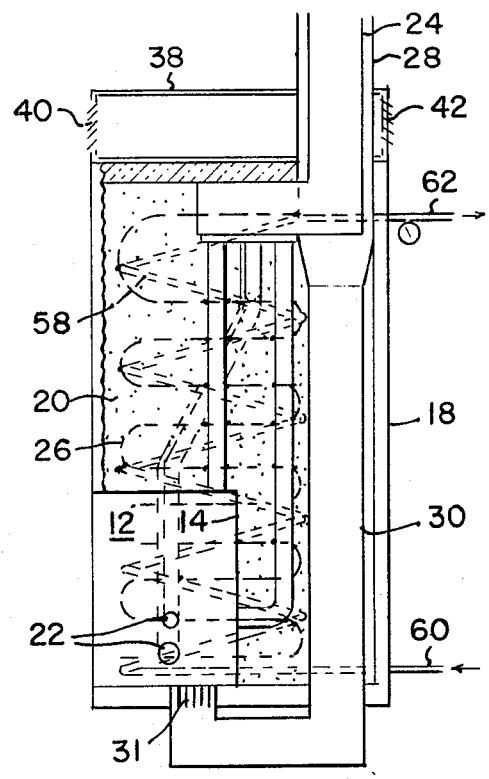
FIG. 4 is a cross-sectional view illustrating the heat exchanger of a hot water heating system embedded in the heat storage medium.

The heat storing fireplace as illustrated in FIGS. 1 and 2 includes a combustion area 12 surrounded by a firebox 14 which may be fabricated by welding sheets of heavy steel plate in an appropriate manner. The front opening of the fire-box 14 is preferably covered by conventional glass fireplace doors 13 as illustrated in FIG. 3. The fire-box 14 is surrounded by a heat storage medium which may be an enclosure 18 having an open top which contains a material 20 having a high specific heat such as sand or gravel. The enclosure 18 can be formed of a variety of materials, but one operative embodiment utilizes a layer of fire-clay slurry coating both sides of a metal lath framework. The metal lath framework is preferably welded to the fire-box 14 before being coated with slurry. The inner surfaces of the enclosure are preferably covered with a heavy asbestos fibre insulative coating to prevent heat from escaping therethrough. Alternatively, the entire fireplace may be formed by stacking a large number of heat conductive bags filled with a high specific heat material such as sand in a rectangular configuration.

Exhaust gases from the burning fuel 16 flow from the combustion area 12 through a plurality of conduits 22 extending from the fire box 14 to a vertical exhaust outlet 24. The conduits 22 are of heat conducting material so that heat from the exhaust gases is transferred to the material 20. The inside diameters of the conduits 22 are selected to equalize the flow of exhaust gases through the respective conduits 22. Thus, for example, the flow of exhaust gases through the upper conduits 22b would ordinarily be greater than the flow of exhaust gases through the lower conduits 22a since the exhaust gases entering the upper conduit 22b are hotter and exhaust conduit 22b is shorter than conduit 22a. However, since conduit 22b has a smaller inside diameter than conduit 22a, the flow of exhaust gases through both pairs of conduits 22a, b are equal. As best illustrated in FIG. 2, the heat from the conduits 22 is further distributed in the material 20 by a heat conducting lattice 26 extending through the material 20 in a circuitous path. The lattice 26 is secured to the conduits 22 in a suitable manner such as by welding.

Combustion air is conveyed to the combustion area 12 through an inlet jacket 28 surrounding the exhaust outlet 24 and an inlet duct 30. The inlet duct 30 terminates in a grate 31 on the floor of the fire-box 14. As combustion air flows through the inlet jacket 28 it absorbs heat from the exhaust gases in the exhaust outlet 24 so that the combustion air is pre-warmed before entering the combustion area 12. Additionally, the inlet jacket thoroughly isolates the exhaust outlet 24 from the surrounding support structure. Since the conduits 22 intersect the fire-box 14 on the horizontal, and because of the additional drag created by the relatively narrow conduits 22, an exhaust fan 32 driven by a conventional motor 34 is provided to create a draft through the combustion area 12. The fan 32, motor 34, exhaust outlet 24 and inlet jacket 28 are covered by a small roof 36 to shield these components from moisture.

Heat stored in the material 20 slowly dissipates through a rectangular plenum 38 covering the enclosure 18. As best illustrated in FIG. 2, the plenum is formed by a pair of louvered sidewalls 40, 42 which are separated from each other by a baffle 44. The baffle 44 contains an opening 46 therethrough, and a fan 48 driven by a motor 50 is mounted in the opening 46 to convey air into the plenum 38 through louver 40 where it is heated and out louver 42. If desired, the motor 50 may be actuated by a conventional thermostat 52 when the temperature in the surrounding area falls below a preset value.

In operation, fuel 16 such as wood, coal, oil or gas is burned in the fire-box 14. As the exhaust gases flow through the conduits 22 and exhaust outlet 24 heat is transferred to the material 20 by the conduits 22 and the heat conducting lattice 26. The material 20 regulates the peak temperature from the burning fuel 16 while storing the heat for subsequent use. At the same time, combustion air entering the fire-box 14 through the inlet jacket 28 and duct 30 is pre-warmed. When the fire in the fire-box 14 is subsequently extinguished, the heat stored in the material 20 is slowly dissipated by air flowing through the plenum 38 when the motor 50 is actuated. Of course, the motor 50 may also be actuated when fuel 16 is being burned in the fire-box 14.

Figure 5:
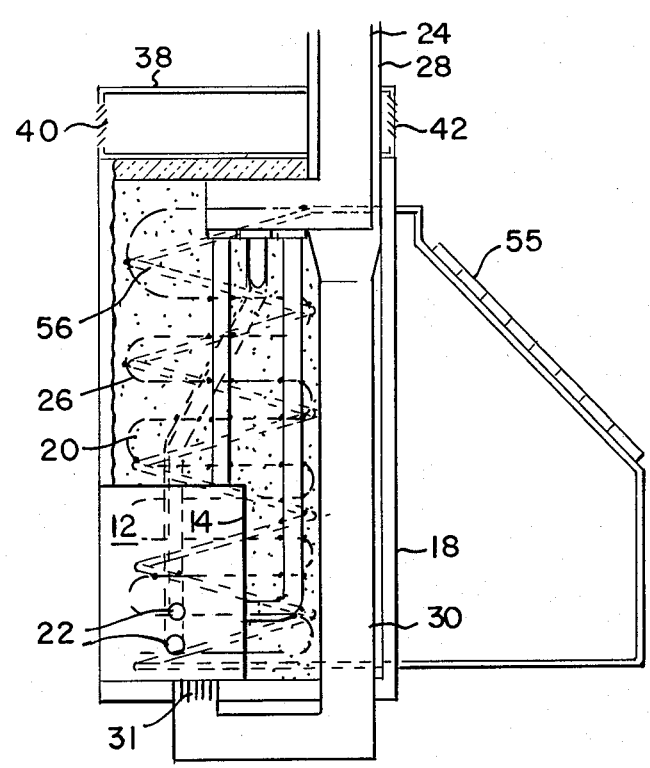
FIG. 5 is a cross-sectional view illustrating the heat exchanger of a solar heating system embedded in the heat storage medium.

The inventive heat storing fireplace may also be utilized to consume electrical power during off-peak periods for subsequent utilization of the electrically produced heat during peak power periods as illustrated in FIG. 3. For this purpose, an electrical heating coil 54 of conventional variety is embedded in the material 20 along the bottom of the enclosure 18 and connected to the heat dissipating lattice 26. During periods of low power consumption when power is relatively inexpensive the heating element 54 may be utilized to heat the material 20. Thereafter, the heat produced by the heating element 54 during off-peak power periods is subsequently dissipated during periods where power is relatively expensive. The heat storing fireplace may also be used to store heat generated by a conventional solar heat collector as illustrated in FIG. 5. The heat collector 55 is connected to a heat exchanger 56 which is embedded in the material 20 along the bottom of the enclosure 18 to supply heat to the material 20 during daylight hours. The heat exchanger 56 is preferably connected to the heat conducting lattice 26 in order to better distribute heat throughout the material 20. The heat stored in the material 20 is then utilized during the evening hours or on cloudy days.

Although the primary mechanism for removing heat stored in the material 20 is the plenum 38, the heat storing fireplace 10 may also be utilized to directly heat cold water in a hot water heating system. As illustrated in FIG. 4, a heat exchanger 58, which is preferably connected to the heat conducting lattice 26, is embedded in the material 20. One end of the heat exchanger 58 is connected to the cold water supply line 10 while the outlet is connected to the hot water distribution system 62. Similarly, heat from a solar heat collector 55 may be transferred to the material 20 by a liquid recirculating through heat exchange tubes 56.

Figure 6:
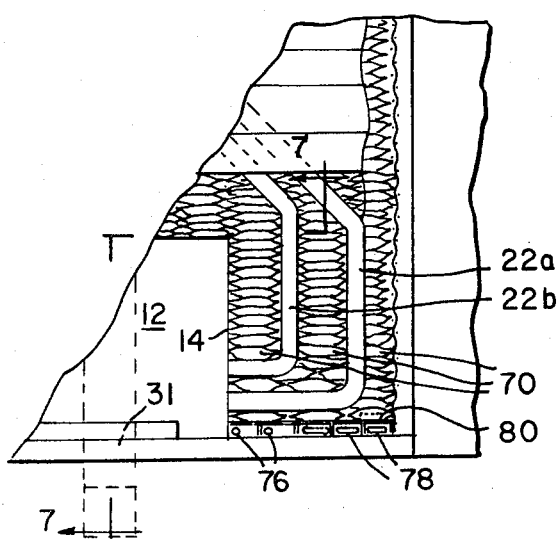
FIG. 6 is a front elevational view of another embodiment of the heat storing fireplace.
Figure 7:
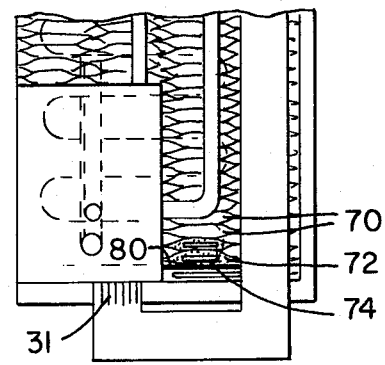
FIG. 7 is a cross-sectional view of the heat storage fireplace taken along the line 7—7 of FIG. 6.

In an alternative embodiment of the heat storing fireplace, as illustrated in FIGS. 6 and 7, the heat storage medium is a large number of bags 70 containing a material 72 having a high specific heat. The bags 70 are of a conductive material such a metallic foil which may be anodized or otherwise color treated on one surface to efficiently absorb heat and radiate it to the material 72. The sizes of the bags 70 may vary depending upon their position. For example, large size bags may be used to construct the floor, top and sides while smaller bags may be used internally.

As best illustrated in FIG. 7, metallic honeycomb assemblies 74 may be inserted in the bags 70 with the material 72 to greatly improve the heat transfer characteristics from the bags 70 to the material 72.

The remaining components of the fireplace are as illustrated in FIGS. 1-5. The exception is that heating elements 76 corresponding to the heating coils 54 (FIG. 3), and heat exchanger tubes 78 corresponding to the tubes 56 (FIG. 5) and 58 (FIG. 4) are placed within metal tunnels 80 at the bottom of the fireplace. This construction facilitates replacement of the heating elements 76 and heat exchanger tubes 78 without removing the bags 70.

The heat storing fireplace of the present invention is thus capable of efficiently storing heat generated under optimum conditions for relatively slow utilization over a fairly long period of time.

I claim:

1. A heat storing fireplace, comprising:
   a firebox at least partially enclosing a combustion area;
   a heat storage medium having a relatively high specific heat surrounding said firebox, said heat storage medium including a plurality of heat conductive bags containing a material having a high specific heat;
   an exhaust outlet extending upwardly above said storage medium;
   a plurality of heat conducting conduits positioned between said firebox and exhaust outlet in a circuitous route within said heat storage medium with said heat conductive bags stacked around said firebox and said heat conducting conduits such that heat from exhaust gases flowing through said conduits is stored in said heat storage medium; and
   ventilation means allowing heat transfer from said storage medium such that heat may be generated during a relatively brief period and utilized over a relatively long period.

2. The heat storing fireplace of claim 1 wherein the surfaces of said bags are color treated to efficiently absorb heat and radiate heat to said material.

3. The heat storing fireplace of claim 1 wherein said bags are stacked on a plurality of heat conductive tunnels each of which surround a heat transfer element to allow removal of said heat transfer element without removing said bags.

4. The heat storing fireplace of claim 1 wherein said bags contain a heat conductive honeycomb assembly with said material for improving the heat transfer characteristics from said bags to said material.

* * * * *